(No Model.)

W. R. M. WHEELER.
BRIDLE BIT.

No. 431,760. Patented July 8, 1890.

WITNESSES
F. L. Ourand
E. K. Stewart

INVENTOR
Wm R. M. Wheeler
by A. B. Webb his Attorney

UNITED STATES PATENT OFFICE.

WILLIAM R. M. WHEELER, OF PINKHAMTON, COLORADO.

BRIDLE-BIT.

SPECIFICATION forming part of Letters Patent No. 431,760, dated July 8, 1890.

Application filed January 28, 1890. Serial No. 338,429. (No model.)

*To all whom it may concern:*

Be it known that I, WILLIAM R. M. WHEELER, residing at Pinkhamton, in the county of Larimer and State of Colorado, have invented certain new and useful Improvements in Bridle-Bits, of which the following is a specification.

My invention relates to that class of bridle-bits known as "driving-bits;" and it has for its object to provide such a bit which will be cheap as to cost, simple in construction and effective for its desired purpose.

My invention consists in certain novel features of construction and arrangement of parts, all of which will hereinafter be fully described in the annexed specification and particularly pointed out in the claims.

Figure 1:
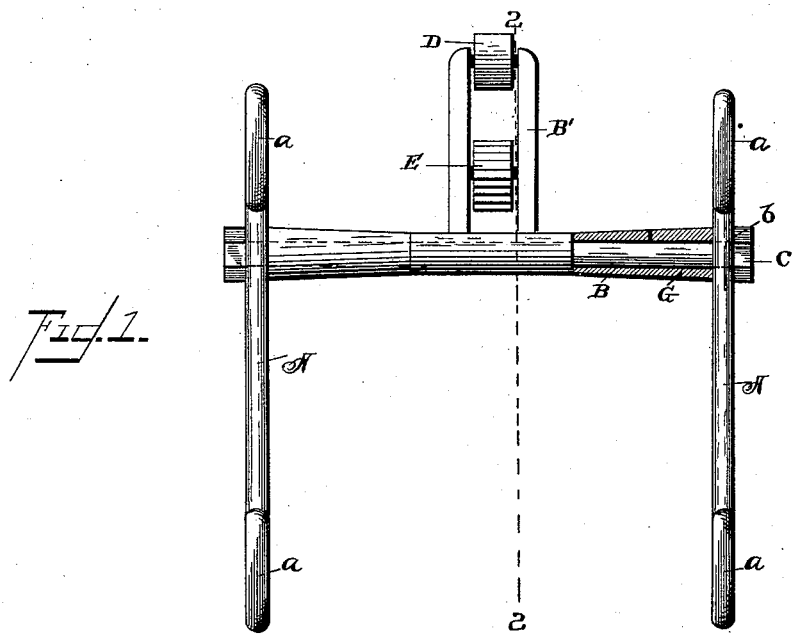
Figure 2:
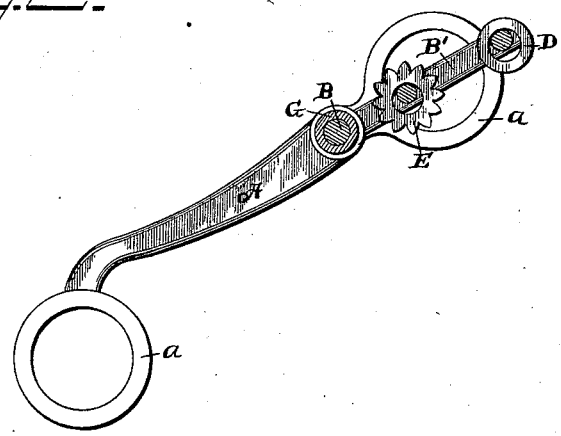

In the drawings, Figure 1 represents a plan view, partly in section, of my improved bit; and Fig. 2, a section on the line 2 2 of Fig. 1.

Referring to the drawings by letters, A indicates the cheek-pieces, which may be of varied ornamental forms, and which are provided with the usual rings or links $a$ $a$ at their outer ends, to which the driving-reins may be secured in the usual manner.

B denotes a cross-bar, to which the cheek-pieces are connected, preferably, by passing the ends of the said bar through apertures $b$ in the cheek-pieces and holding same in place by the nuts C C, which may be suitably ornamented, if desired, by the adjustment of which different-formed cheek-pieces may be secured to the bar B. To obtain the proper leverage for the bit, I join the bar and cheek-pieces at a point about one-third the distance from one end of said cheek-pieces, as shown.

The cross-bar B is provided with a rearwardly-projecting arm B', preferably formed integral therewith, in the outer end of which is loosely journaled a roller D, and about midway thereof a spur-wheel E is journaled, as shown.

In the practical adjustment of my bit to a horse's mouth, the part B' extends rearward over the tongue, and by having a roller loosely journaled on said end cutting the roof of the horse's mouth is prevented when falling and striking on the ground. To each side of the extension B' sleeves G G are disposed over the bar B to prevent the horse holding the said bar rigid between his teeth.

From the foregoing description, taken in connection with the drawings, the advantages of my improved bit will readily appear. It will be seen that when it becomes necessary to check the horse a strong pull on the lines will cause the extension B' to bear against the roof of the mouth, and by having a spur-wheel journaled on the extension, as described, the same will normally rest on the horse's tongue. It will also be seen that any attempt made by the animal to move the bit forward so as to grasp it with his teeth will cause the wheel to cut into the tongue and make him cease to manipulate it in this manner.

Having thus described my improvement, what I claim, and desire to secure by Letters Patent, is—

1. A curbing-bit consisting of the cheek-pieces A A, the cross-piece B, having a rearwardly-extending arm and provided at its outer end with a loose roller, said cross-piece B connected to the cheek-pieces at a point to one side of the center thereof, substantially as shown and described.

2. The hereinbefore-described improvement in curbing-bits, consisting of the bar B, having a rearwardly-extending arm B', provided with a roller loosely journaled in the outer end thereof, and a spur-wheel journaled about centrally thereof, as shown, sleeves mounted upon the ends of the bar B, and the removable cheek-pieces secured upon the ends of the bar B at a point to one side of the center thereof, all arranged substantially as and for the purpose described.

In testimony whereof I affix my signature in presence of two witnesses.

WILLIAM R. M. WHEELER.

Witnesses:
 MOURIE R. YARNELL,
 HENRY WILSON.